United States Patent
Holland et al.

(10) Patent No.: US 12,466,711 B2
(45) Date of Patent: Nov. 11, 2025

(54) APPARATUS, SYSTEM, AND METHOD FOR AUTOMATING PARTS UNLOADING

(71) Applicant: Toyota Motor Engineering & Manufacturing North America, Inc., Plano, TX (US)

(72) Inventors: Lloyd R. Holland, Georgetown, KY (US); Scottie L. Foster, Lawrenceburg, KY (US); Bradley J. Garcia, Louisville, KY (US); Michael C. Greenlee, Paris, KY (US); Jeffrey L. James, Mount Sterling, KY (US); Annetta L. Allen, Trenton, MI (US); Ronnie G. Kiser, Jr., Lexington, KY (US); Andrew B. Novian, Winchester, KY (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 331 days.

(21) Appl. No.: 18/126,912

(22) Filed: Mar. 27, 2023

(65) Prior Publication Data
US 2024/0327178 A1    Oct. 3, 2024

(51) Int. Cl.
*B66F 9/04*    (2006.01)
*B65G 43/08*    (2006.01)

(52) U.S. Cl.
CPC ............... *B66F 9/04* (2013.01); *B65G 43/08* (2013.01); *B65G 2203/0258* (2013.01); *B65G 2203/044* (2013.01)

(58) Field of Classification Search
CPC .. B66F 9/04; G05G 1/12; B65G 43/08; B65G 2203/0258
(Continued)

(56) References Cited

U.S. PATENT DOCUMENTS 4,014,578 A * 3/1977 Grott ...................... B65G 53/46
                                                         406/127
5,360,316 A * 11/1994 O'Mara .................... B07C 1/04
                                                         198/530
(Continued)

FOREIGN PATENT DOCUMENTS

CN    201799844 U    4/2011
CN    108750686 A    11/2018
(Continued)

*Primary Examiner* — Gene O Crawford
*Assistant Examiner* — Lester Rushin, III
(74) *Attorney, Agent, or Firm* — Snell & Wilmer LLP

(57) ABSTRACT

Apparatuses, systems, and methods for receiving a part from another system. An apparatus includes a platform configured to receive a first part and a second part to be unloaded from another apparatus. The apparatus further includes a first guide member and a second guide member. The first guide member and the second guide member are configured to engage with, respectively, a first engaging member and a second engaging member on another apparatus and enable the first part and the second part to be unloaded. The first guide member and the second guide member may be configured to contact, respectively, the first engaging member and the second engaging member to actuate a first gate member connected to the first engaging member and a second gate member connected to the second engaging member to move to open positions to enable the first part and the second part to be released.

20 Claims, 8 Drawing Sheets

(58) Field of Classification Search
USPC ......... 198/301, 463.1, 463.4, 500, 523, 526, 198/529, 530, 531, 534, 538, 539, 540, 198/703
See application file for complete search history.

(56) References Cited

U.S. PATENT DOCUMENTS

| | | | | |
|---|---|---|---|---|
| 7,331,444 | B2* | 2/2008 | Barilovits | B65G 47/52 |
| | | | | 198/626.5 |
| 8,646,592 | B1* | 2/2014 | Liao | B65B 57/14 |
| | | | | 198/474.1 |
| 9,403,645 | B2* | 8/2016 | Nakamura | G01N 35/021 |
| 11,339,001 | B2* | 5/2022 | Suemichi | G01G 19/393 |
| 11,691,823 | B1* | 7/2023 | Mohammed | B65G 21/10 |
| | | | | 198/502.3 |

FOREIGN PATENT DOCUMENTS

| | | |
|---|---|---|
| CN | 109179206 A | 1/2019 |
| CN | 208531700 U | 2/2019 |

* cited by examiner

APPARATUS, SYSTEM, AND METHOD FOR AUTOMATING PARTS UNLOADING

BACKGROUND

Field

The present disclosure relates to apparatuses, systems, and methods for automating parts unloading.

Description of the Related Art

In manufacturing plants (such as, e.g., auto manufacturing plants), unloading (or moving) of a part from one area, system, apparatus, or device to another area, system, apparatus, or device can conventionally involve using multiple electrically controlled apparatuses, systems, or devices. For example, such electrically controlled systems may utilize multiple hydraulic members and/or electric motors to unload a part (e.g., a fuel tank) from a dolly to a lifter—as but one example, one or more electrically controlled robotic arms may be used to move the part from the dolly to the lifter. However, such electrically controlled systems are expensive and include many points of failure (because of their complexity) requiring their own maintenance (costing even more resources).

Hence, there is a need for apparatuses, systems, and methods to more efficiently (i.e., at a lower cost and/or a shorter time frame) unload or move a part from one area, system, apparatus, or device to another area, system, apparatus, or device by, e.g., reducing the number of hydraulic members and/or electric motors utilized.

SUMMARY

Described herein is an apparatus for receiving at least a part to be unloaded or moved from one area or system to another area or system. The apparatus includes a platform. The platform may be configured to receive a first part and a second part to be unloaded from another apparatus. The apparatus further includes a first guide member and a second guide member. The first guide member may be configured to engage with a first engaging member on another apparatus to enable the first part to be unloaded from another apparatus onto the platform. The second guide member may be configured to engage with a second engaging member on another apparatus to enable the second part to be unloaded from another apparatus onto the platform.

Also described is a system for receiving at least a part to be unloaded from another system. The system includes a platform. The platform may be configured to receive a first part and a second part to be unloaded from another apparatus. The system further includes a first guide member and a second guide member. The first guide member may be configured to engage with a first engaging member on another apparatus and actuate the first engaging member on another apparatus to move to enable the first part to be unloaded from another apparatus onto the platform. The second guide member may be configured to engage with a second engaging member on another apparatus in response to the first part being unloaded from another apparatus onto the platform and actuate the second engaging member on another apparatus to move to enable the second part to be unloaded from another apparatus onto the platform.

Moreover, also described is a method for receiving at least a part to be unloaded from another system. The method includes providing a platform. The platform may be configured to receive a first part and a second part to be unloaded from another apparatus. The method also includes engaging, via a first guide member, with a first engaging member on another apparatus. Engaging with the first engaging member on another apparatus via the first guide member may be performed such that the first guide member contacts the first engaging member to actuate the first engaging member to move and enable the first part to be released from another apparatus onto the platform. The method further includes engaging, via a second guide member, with a second engaging member on another apparatus. Engaging with the second engaging member on another apparatus via the second guide member may be performed such that the second guide member contacts the second engaging member to actuate the second engaging member to move and enable the second part to be released from another apparatus onto the platform.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1A:
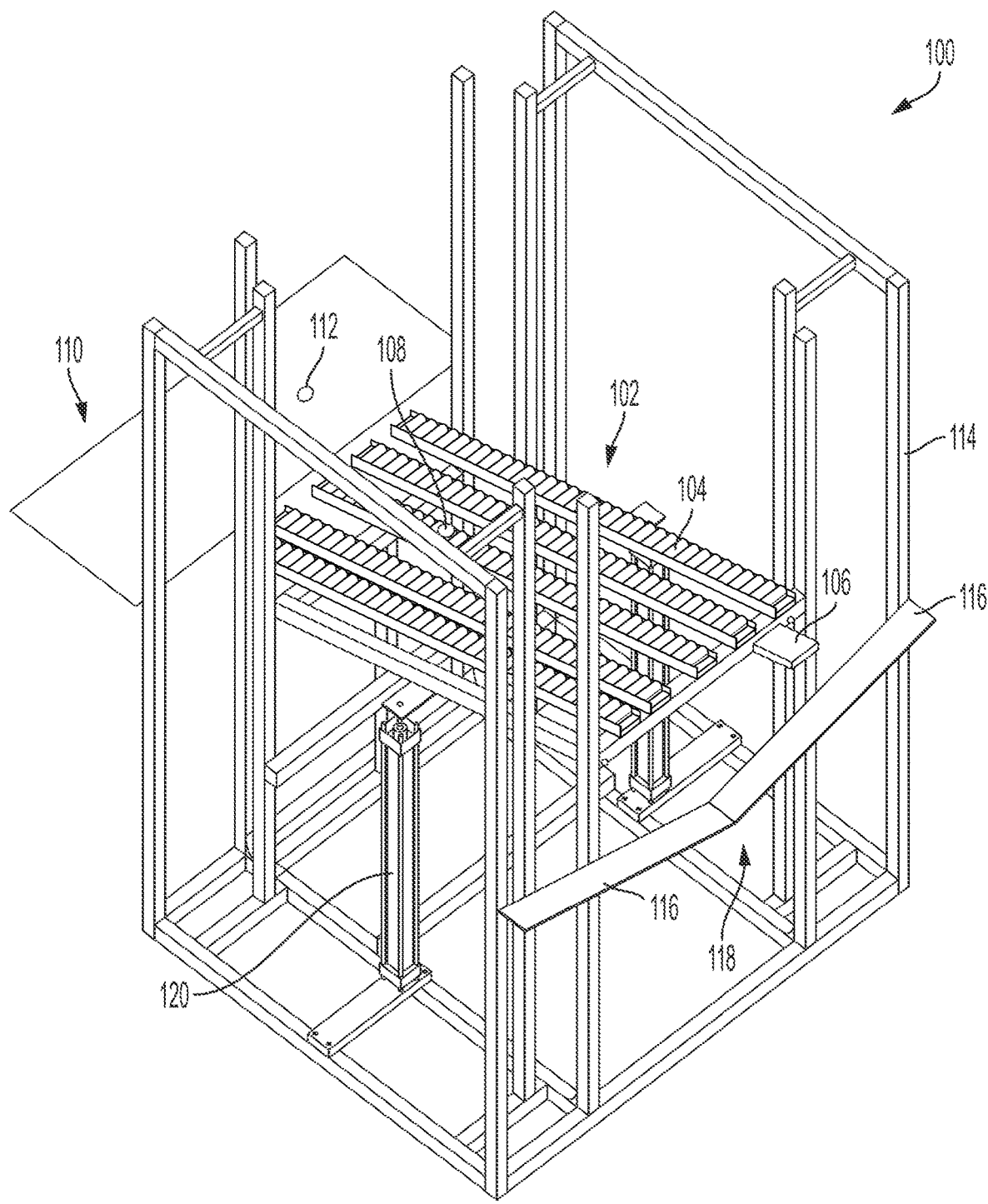
FIG. 1A is an illustration of a perspective view of an apparatus for unloading a part from another system according to an embodiment of the present invention.

The present disclosure describes apparatuses, systems, and methods for automatically unloading or moving parts out of a part delivery system to a workstation efficiently (e.g., at a lower cost). These apparatuses, systems, and methods provide many benefits and advantages including reducing or minimizing a number of hydraulic or electric devices for unloading or moving the parts. For example, the apparatuses, systems, and methods described herein may eliminate a need for one or more robotic arms to unload or move the parts from the part delivery system to the workstation. Reducing or minimizing the number of hydraulic or electric devices in such a process can lower the amount of resources (i.e., cost) required to manufacture a product such as an automobile or the like. That is, these apparatuses, systems, and methods may eliminate a need for extra hydraulic or electric device(s) from such manufacturing process that otherwise may add to the manufacturing cost of the product and also may require their own maintenance (further adding to the manufacturing cost of the product).

As but one example, the apparatuses, systems, and methods described herein may be used to unload or move a part (e.g., a fuel tank) from a delivery dolly to a preparation or installation workstation in an automobile manufacturing plant. Such an apparatus (e.g., a lifter) may include a platform and guide members designed to engage with corresponding engaging members on the delivery dolly. The delivery dolly may have a plurality of multi-level (e.g., two (2)-level) holding stations to deliver a plurality of parts to the workstation. As the delivery dolly is moved into a particular position in front of the apparatus described herein (e.g., with a first set of two (2)-level holding stations on the delivery dolly positioned in front of the apparatus), a first guide member on the apparatus may engage with a first-level engaging member on the delivery dolly to move a gate member of the first-level holding station on the delivery dolly to an open position to release a first part out of the first-level holding station onto the platform on the apparatus. When the apparatus detects the presence of the first part on the platform (e.g., via a sensor), the apparatus may automatically raise the platform to a predetermined height, and a second guide member connected to the platform on the apparatus may engage with a second-level engaging member on the delivery dolly. As the second guide member on the apparatus engages with the second-level engaging member on the delivery dolly, another gate member on the delivery dolly (i.e., a gate member of a second-level holding station on the delivery dolly) may be moved to an open position to release a second part out of the second-level holding station onto the platform on the apparatus. An operator at the workstation may retrieve the first part and the second part from the platform on the apparatus to process the parts before the delivery dolly is advanced or moved so that subsequent parts to be processed (in the next set of holding stations on the delivery dolly) may be unloaded and moved to the workstation.

The platform on the apparatus described herein may be tilted and include a set of rollers so as to allow the operator to receive the parts from the delivery dolly at the preparation or installation workstation on the other side of the delivery dolly without requiring any extra hydraulic or electric devices to unload or move the parts from the delivery dolly. That is, once the parts are released out of the delivery dolly onto the platform on the apparatus, the parts may slide down the set of rollers and/or be pulled by the operator over the set of rollers towards the workstation. The tilted platform having the set of rollers may allow the operator to take advantage of the gravity pulling the parts towards the ground to efficiently unload or move the parts from the delivery dolly to the workstation without requiring additional robotic arms to unload or move the parts out of the delivery dolly. Furthermore, the guide members on the apparatus may be designed such that the guide members can engage with the engaging members on the delivery dolly as the delivery dolly is positioned in front of the apparatus and the parts on the delivery dolly may be automatically released onto the platform on the apparatus.

Turning to FIGS. 1A-1E, a part unloading apparatus 100 is described. The part unloading apparatus 100 includes a platform 102, a first guide member 118, and a second guide member 106.

As shown in FIG. 1A, the platform 102 may include a plurality of rollers 104. The plurality of rollers 104 may include one or more (e.g., five (5)) sets of rollers 104 forming a surface. While five (5) sets of rollers 104 are shown, it would be apparent to one of ordinary skill in the art that the plurality of rollers 104 may include one or more sets of rollers 104 (e.g., one (1) set, two (2) sets, three (3) sets, four (4) sets, etc.) without departing from the spirit of the present disclosure. The surface formed by the plurality of rollers 104 may be tilted (e.g., at an incline or a decline relative to the ground) so as to (i) allow an object on the plurality of rollers 104 to move from one side to another side due to gravity and/or (ii) assist an operator to pull the object across the platform 102 (i.e., over the plurality of rollers 104).

Moreover, the platform 102 may include a sensor 108. The sensor 108 may be or include one or more individual sensors and may be configured to detect sensor data indicative of a presence of an object (e.g., a part and/or a container such as a tray used to receive the part) on the platform 102. For example, the sensor 108 may be or include a photo eye of various types known in the art (which may detect the presence of the object when covered), an image sensor (such as, e.g., a radar sensor, a LIDAR sensor, and/or a camera, or any other image sensor capable of detecting light having any wavelength) configured to detect image data indicative of the presence of the object on the platform 102, and/or a weight sensor configured to detect weight data indicative of the presence of the object on the platform 102. The sensor 108 may additionally and/or alternatively be disposed on a different part (other than the platform 102) of the part unloading apparatus 100.

The first guide member 118 may include at least one guide portion 116. For example, the first guide member 118 may include two (2) guide portions 116—each guide portion 116 being a rectangular plate (e.g., made of steel) and one guide portion 116 and the other guide portion 116 forming an angle so as for the first guide member 118 to have a "V" shape. The two guide portions 116 forming the "V" shape may further include a horizontal portion between the two tilted guide portions 116 of, e.g., mirrored shapes and/or orientations. An engaging member on another apparatus engaged with (e.g., in contact with a bottom surface of) the first guide member 118 may rest underneath the horizontal portion while, e.g., a part is unloaded from another apparatus onto the platform 102 in response to the engaging member on another apparatus being engaged with the first guide member 118. The first guide member 118 (i.e., the guide portion(s) 116) may be connected to a frame 114 on the part unloading apparatus 100 at a position (e.g., at a particular height) that allows the first guide member 118 to engage with an engaging member on another apparatus as described herein.

The first guide member 118 may engage with an engaging member of another system (e.g., on another apparatus-such as a dolly as also referred to herein-holding a plurality of parts to be unloaded onto the platform 102) when the dolly is moved to a particular position relative to the part unloading apparatus 100. For example, the engaging member (e.g., a first engaging member) on the dolly may include a wheel that may engage with the first guide member 118, starting at one end of the first guide member 118—i.e., at the highest point at the one end of the first guide member 118. As the dolly (including the first engaging member on the dolly) moves in a direction parallel with the lengthwise direction of the first guide member 118 (i.e., from the one end to the other end) while the first guide member 118 and the first engaging member are engaged (e.g., in contact with each other), the first engaging member on the dolly (which may be configured to spin and also adjust its position—e.g., its height relative to the ground) may change its position (e.g., downward-toward the ground). That is, the first guide member 118 may cause the first engaging member on the dolly to be pushed downward as the wheel on the first engaging member on the dolly rolls underneath the first guide member 118 (from the one end to the lowest portion of the V-shaped first guide member 118) while staying in contact with the first guide member 118.

The first engaging member on the dolly may be connected to, e.g., a spring that forces the wheel to be tensioned to stay in contact with the first guide member 118 as the wheel rolls underneath the first guide member 118. Moreover, the first engaging member on the dolly may be connected to a gate member on the dolly blocking a part from being released out of the dolly and may be configured to actuate the gate member to move to an open position (e.g., by being lowered as the wheel—in contact with the bottom surface of the first guide member 118—rolls from the one end to the lowest point of the first guide member 118) to allow the part to be released out of the dolly onto the platform 102 on the part unloading apparatus 100. As the wheel rolls past the lowest point of the first guide member 118 toward the other end (as the dolly continues to move), the first engaging member (including the wheel) may rise back up while actuating the gate member on the dolly to rise back up to a closed position. The gate member on the dolly being in the closed position would allow a new part to be placed and held in the dolly until the new part is ready to be released out of the dolly.

The part unloading apparatus 100 may also include a lifter 120. The lifter 120 may be connected to the platform 102 and configured to move the platform 102 up and down. For example, the lifter 120 may be a hydraulic lifter including one or more pneumatic cylinders configured to raise or lower the platform 102 or a motorized lifter including a motor configured to actuate the platform 102 to be raised or lowered.

Furthermore, the part unloading apparatus 100 may include or be connected to a workstation 110. That is, the workstation 110 may be a part of the part unloading apparatus 100, or alternatively, the workstation 110 may be or include a separate apparatus or system which is not a part of the part unloading apparatus 100. The workstation 110 may include a user interface 112. The user interface 112 may include one or more input devices (or one or more circuitries configured for) such as a button, a keyboard, a mouse, a touchscreen, a microphone, or the like. The user interface 112 may receive input from a user such as an operator unloading a part from another system or apparatus (e.g., a dolly) via the part unloading apparatus 100. The user interface 112 may receive, e.g., an indication (e.g., an action on the user interface 112, a data input, or the like) from the operator that one or more parts have been successfully unloaded from the dolly and processed and/or a request from the operator to advance or move the dolly to a new position such that additional part(s) may be unloaded onto the part unloading apparatus 100.

Figure 1B:
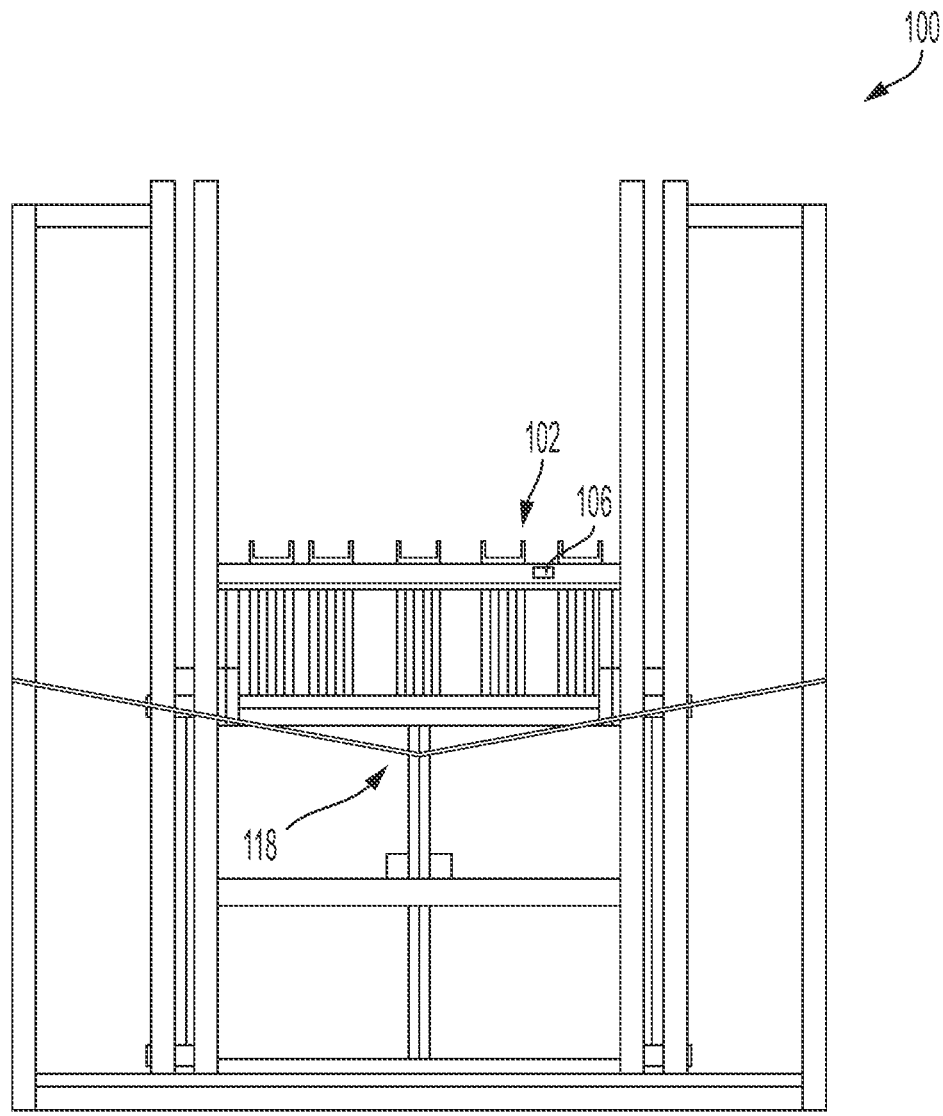
FIG. 1B is an illustration of a front view of an apparatus for unloading a part from another system according to an embodiment of the present invention.
Figure 1C:
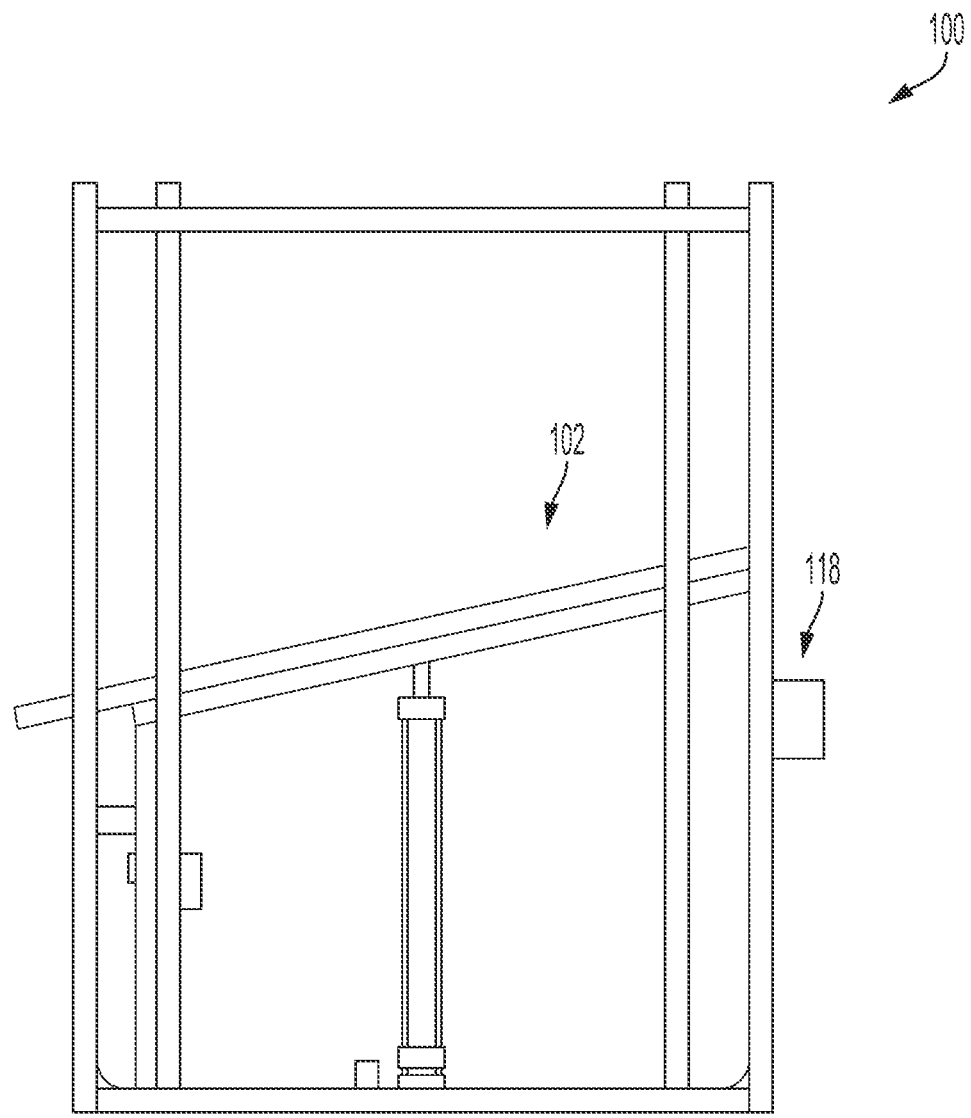
FIG. 1C is an illustration of a side view of an apparatus for unloading a part from another system according to an embodiment of the present invention.
Figure 1D:
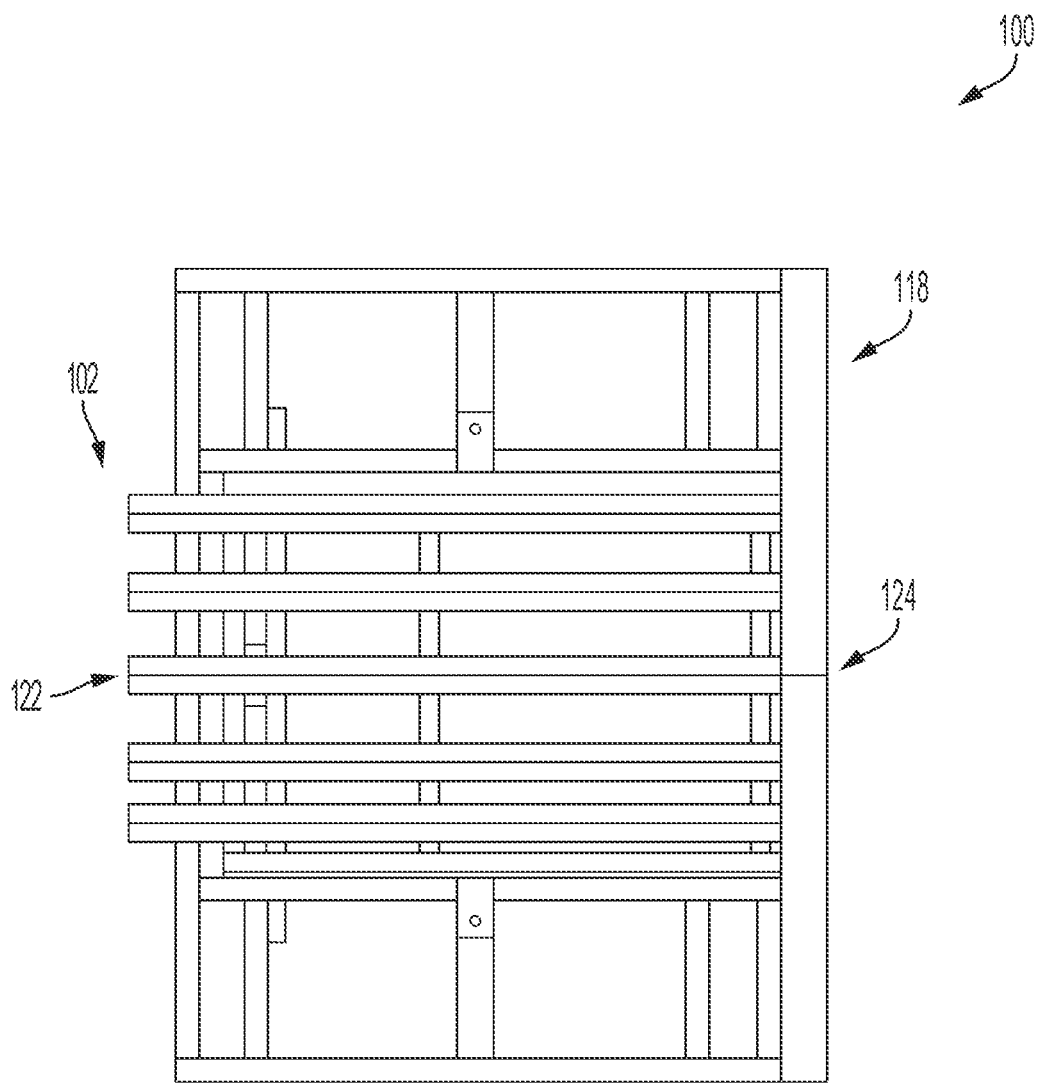
FIG. 1D is an illustration of a top view of an apparatus for unloading a part from another system according to an embodiment of the present invention.
Figure 1E:
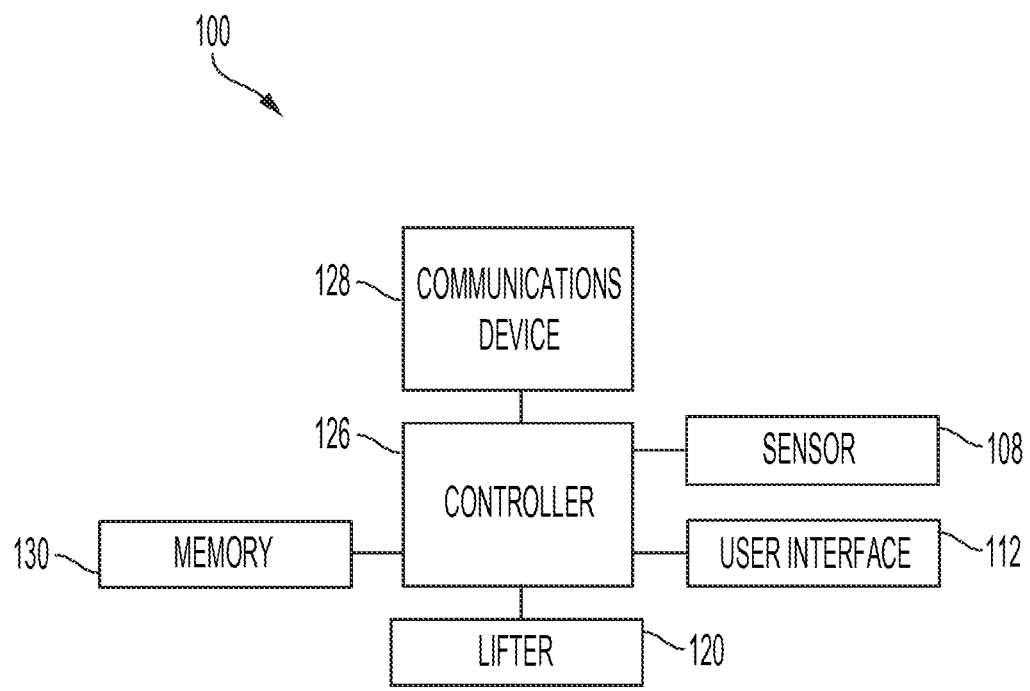
FIG. 1E is a block diagram illustrating a system for unloading a part from another system according to an embodiment of the present disclosure.

As an aside, the user interface 112 may be connected to a controller (see controller 126 described herein with respect to, e.g., FIG. 1E). The controller may include or couple to one or more processors. These one or more processors may be implemented as a single processor or as multiple processors. For example, the controller may be a microprocessor, a data processor, a microcontroller, or other controller, and may be electrically coupled to at least the user interface 112. The controller may be a dedicated controller configured to control the connected user interface 112 or may be coupled to or be a part of another controller which controls other components. For example, the controller may be connected to a memory (see memory 130 described herein with respect to FIG. 1E), a communications device or circuitry (see communications device 128 described herein with respect to FIG. 1E), the lifter 120, and/or the sensor 108 as described further herein.

The second guide member 106 may be attached or connected to the platform 102 (e.g., to a frame or the like having the plurality of rollers 104) such that the second guide member 106 may move, e.g., up and down, with the platform 102 (as the platform 102 is actuated by the lifter 120). As but one example, the second guide member 106 may be raised when the sensor 108 detects a presence of a part on the platform 102 as described further herein with respect to FIG. 1B.

FIG. 1B is an illustration of a front view of the part unloading apparatus 100. The platform 102 (e.g., the base of the platform 102) may be at a particular (e.g., predetermined) level or height relative to the ground when the platform 102 is in a first position (i.e., at a first height). The first height of the platform 102 may be such that a part (e.g., a first part) may be unloaded (e.g., from a dolly) onto the platform 102 without the part being dropped more than a threshold height from a releasing apparatus (e.g., the dolly) onto the platform 102 and without any portion of the part unloading apparatus 100 (e.g., the first guide member 118) blocking the part from being unloaded onto the platform 102.

As described herein, when the platform 102 moves to a second position (e.g., a second height greater than the first height), the second guide member 106 connected to the platform 102 may move from its first position (e.g., a first height) to its second position (e.g., a second height). As the second guide member 106 moves from its first position to its second position, the second guide member 106 may engage with an engaging member (e.g., a second engaging member) on another apparatus (e.g., a dolly). When the second guide member 106 moves from its first position to its second position, the second guide member 106 may be raised (i.e., away from the ground) and may contact and actuate (e.g., push) the second engaging member upward to allow another part (e.g., a second part) to be unloaded from the dolly onto the platform 102. For example, the second engaging member on the dolly may be connected to a second gate member on the dolly blocking the second part from being released out of the dolly and may be configured to actuate the second gate member to move to an open position (e.g., by being lowered) to allow the second part to be released out of the dolly onto the platform 102 on the part unloading apparatus 100 when the second guide member 106 is engaged with the second engaging member on the dolly.

The platform 102 may move to its second position (e.g., be raised upward and away from the ground via the lifter 120 described herein with respect to FIG. 1A) when the sensor 108 described herein with respect to FIG. 1A detects a presence of the first part on the platform 102. For example, a controller (see controller 126 described herein with respect to, e.g., FIG. 1E—connected to at least the sensor 108 and the lifter 120) may determine that the first part is received on the platform 102 based on sensor data detected by the sensor 108 and generate and send a signal to the lifter 120 to actuate the platform 102 from the first position to the second position. After the first part (or a tray on the platform 102 containing the received first part) is removed from the platform 102 (e.g., onto the workstation 110 described herein with respect to FIG. 1A), the first part may be processed by an operator. Then, placing the tray back into the platform 102 (to be detected by the sensor 108) or a user input provided via the user interface 112 described herein with respect to FIG. 1A may cause the controller to send a signal to the lifter 120 to actuate the platform 102 from the first position to the second position. When the platform 102 moves to the second position, the second guide member 106 may engage with (e.g., contact) the second engaging member on the dolly to actuate the second gate member on the dolly to move to an open position. There may be a predetermined duration of delay (e.g., two (2) seconds) between the detection of the presence of the tray on the platform 102 by the sensor 108 (or the receipt of the user input via the user interface 112 as described above) and the move of the platform 102 to its second position so as to allow or ensure, e.g., the first part to be unloaded onto the platform 102 and processed by the operator before the second part is released onto the platform 102.

As described herein, the platform 102 may include a tray to receive, e.g., the first part. An operator may remove the tray from the platform 102 once the first part is received in the tray, work on the first part (and deliver or move the first part onto a next area, system, apparatus, or device—e.g., an installation lifter), and move the tray back onto the platform 102. After the second part has been unloaded onto the platform 102 (or the tray thereon) and worked on by the operator, another predetermined duration of delay (e.g., four (4) seconds-a second delay) may be triggered based on, e.g., the operator providing an indication that the second part has been unloaded and processed (e.g., via the user interface 112 described herein with respect to FIG. 1A). Once the second part has been unloaded, the second delay may be automatically triggered.

After the second delay, the controller may send out a signal or data indicative of an instruction for advancing the dolly so that a subsequent iteration of unloading of part(s) may be started. For example, after the second delay, the controller may transmit (e.g., wirelessly), via a communications device connected to the controller (see communications device 128 described herein with respect to FIG. 1E), the signal or the data indicative of the instruction for advancing the dolly to, e.g., an apparatus such as an automated guide vehicle (AGV) which may pull or push the dolly holding the parts to be unloaded in response to receiving the signal or the instruction from the controller. The AGV may advance the dolly so that subsequent set(s) of parts may be unloaded from the dolly onto the platform 102 by the process of the first part and the second part being released out of the dolly onto the platform 102 as described further herein being repeated. The process of unloading, e.g., the first part and the second part from the dolly onto the platform 102 as described herein may be repeated with the subsequent set(s) of parts to be unloaded. Information such as the delay(s) described herein and the steps of the process of unloading part(s) from the dolly onto the platform 102, as well as information corresponding to how far the dolly needs to be moved by the AGV such that the engaging member(s) on the dolly may be aligned with the respective guide member(s) on the part unloading apparatus 100 (for proper engagement between the engaging member(s) on the dolly and the respective guide member(s) on the part unloading apparatus 100), may be stored as part of a set of instructions on a memory (see memory 130 described herein with respect to FIG. 1E) connected to the controller. The delays, the steps, etc. may be adjusted by changes to the set of instructions such that the behavior of the controller may be adjusted as needed.

FIG. 1C is an illustration of a side view of the part unloading apparatus 100. As shown, the platform 102 may be tilted at an angle (e.g., with a higher end of the platform 102 being closer to the first guide member 118 than a lower end of the platform 102) so as to assist a part unloaded onto the platform 102 to move through the platform 102. That is, for example, the part unloaded onto the platform 102 may be moved (e.g., over the plurality of rollers 104 described herein with respect to FIG. 1A) to the other side of the platform 102 (i.e., opposite the side closer to the first guide member 118) by gravity and/or an operator pulling the part.

FIG. 1D is an illustration of a top view of the part unloading apparatus 100. As shown, the center 122 of the platform 102 and the center 124 of the first guide member 118 (i.e., the lowest point of the first guide member 118) may be aligned so as to ensure that the first guide member 118 (or any portion thereof) is not blocking a part (e.g., a first part) from being released out of another apparatus (e.g., a dolly) when the engaging member on another apparatus is engaged with the first guide member 118 and the engaging member on another apparatus is positioned underneath the lowest point of the first guide member 118 to release the first part as described herein.

FIG. 1E is a block diagram illustrating a system corresponding to the part unloading apparatus 100. As described further herein, the part unloading apparatus 100 includes a controller 126. The controller 126 may be connected to the sensor 108, the user interface 112, the lifter 120, the communications device 128, and/or the memory 130 described herein.

The communications device 128 may be or include a transceiver. The transceiver may be configured to communicate with, e.g., the AGV as described herein. The transceiver may be utilized to send, e.g., data corresponding to an instruction for the AGV to advance (e.g., pull or push) the dolly so that additional part(s) may be released out of the dolly being advanced by the AGV onto the part unloading apparatus 100 as described herein (e.g., after a first part and a second part have been unloaded and processed). The communications device 128 (e.g., the transceiver) may be a network access device capable of communicating via a communications protocol (e.g., a wireless protocol). For example, the communications device 128 may communicate via Bluetooth, Wi-Fi, a cellular protocol, Zigbee, or any other communications (e.g., wireless) protocol. Moreover, the memory 130 may include any non-transitory memory and may store data usable by the controller 126.

Figure 2:
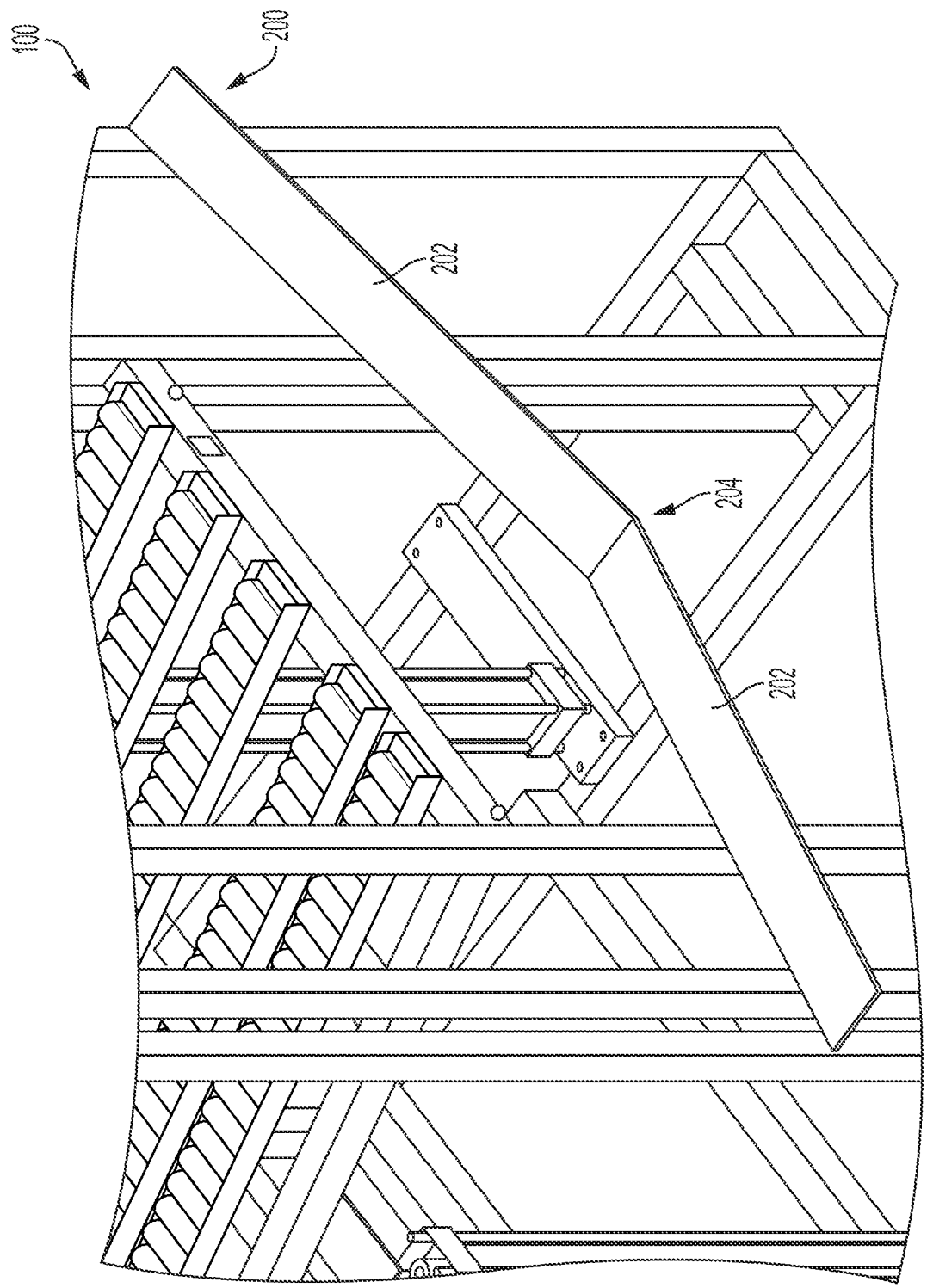
FIG. 2 is an illustration of a portion of a perspective view of an apparatus for unloading a part from another system according to an embodiment of the present invention.

FIG. 2 is an illustration of a portion of a perspective view of the part unloading apparatus 100 described herein with respect to FIGS. 1A-1E. As shown, the part unloading apparatus 100 includes a first guide member 200 (similar to the first guide member 118 described herein with respect to FIGS. 1A-1E). The first guide member 200 may include more than one guide portions 202 (e.g., two (2) guide portions 202) meeting at an angle, the meeting point of the guide portions 202 forming a lowest point 204. As the first guide member 200 is engaged with an engaging member on another apparatus at the lowest point 204 of the first guide member 200, the engaging member on another apparatus may be moved to cause a part on another apparatus to be unloaded out of another apparatus onto the part unloading apparatus 100 (e.g., by actuating a gate member on another apparatus to be moved to an open position), as described herein with respect to FIGS. 1A-1E.

Figure 3:
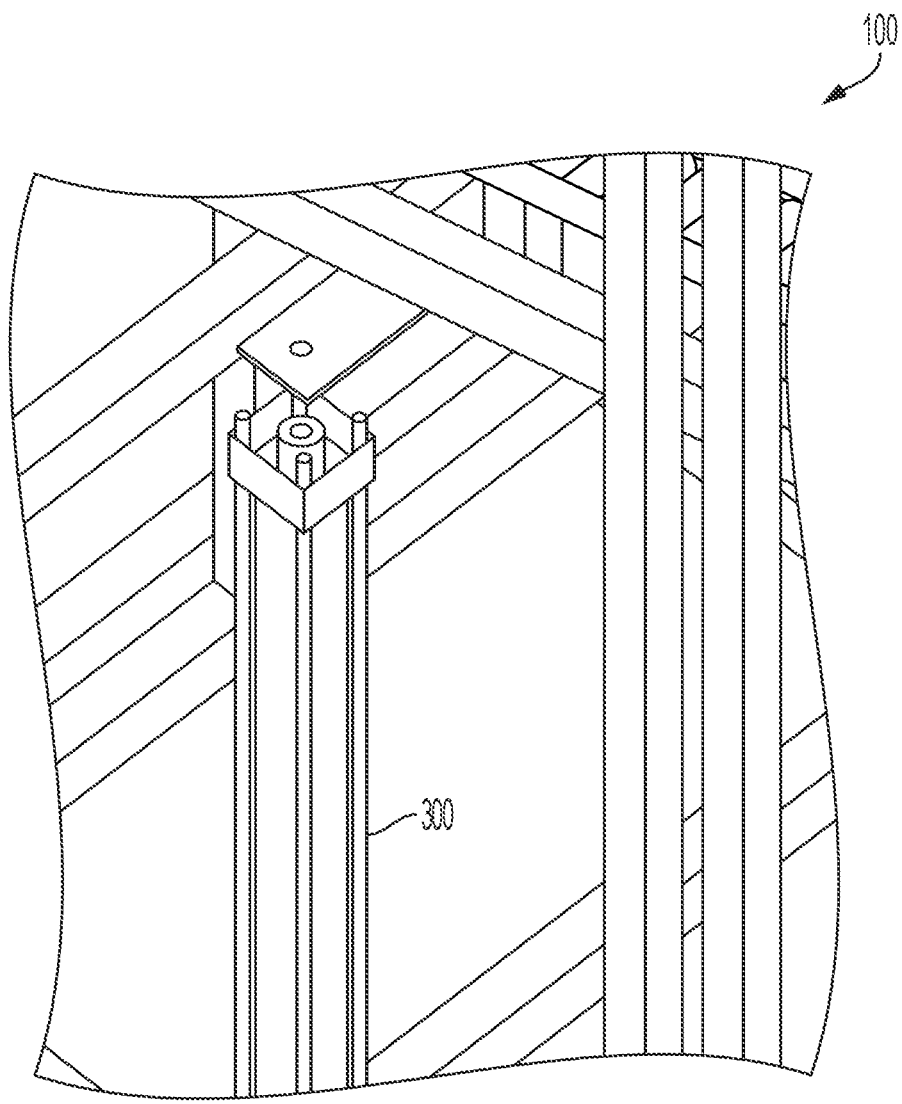
FIG. 3 is an illustration of a portion of a perspective view of an apparatus for unloading a part from another system according to an embodiment of the present invention.

FIG. 3 is an illustration of a portion of a perspective view of the part unloading apparatus 100 described herein with respect to FIGS. 1A-1E. As shown, the part unloading apparatus 100 may include a lifter 300 (similar to the lifter 120 described herein with respect to, e.g., FIG. 1A). The lifter 300 may be a hydraulic lifter including one or more pneumatic cylinders or a motorized lifter including a motor configured to raise or lower the platform 102 described herein with respect to FIGS. 1A-1E. After each iteration of the process of unloading of parts described herein (e.g., after a first part and a second part have been unloaded out of a dolly and then processed), the lifter 300 may move the platform 102 back to its original position before a subsequent iteration of the process is performed. Moreover, the movement of the platform 102 as actuated by the lifter 300 as described further herein may be performed in a controlled manner that ensures that the engaging member(s) (and thus, e.g., the gate member(s), etc.) on another apparatus are moved in a controlled manner, too. The controlled movement may be such that no movement is made forcefully in a way that may result in damage to the part(s) being unloaded, the dolly, and/or the part unloading apparatus 100 described herein.

When the platform 102 is moved to its second position as described herein with respect to FIG. 1B, its height may be substantially similar to the height of the workstation 110 described herein with respect to FIG. 1A such that an operator can reach into the platform 102 to retrieve the first part and the second part onto the workstation 110 without the first part or the second part being dropped or pulled up more than a threshold height.

Figure 4:
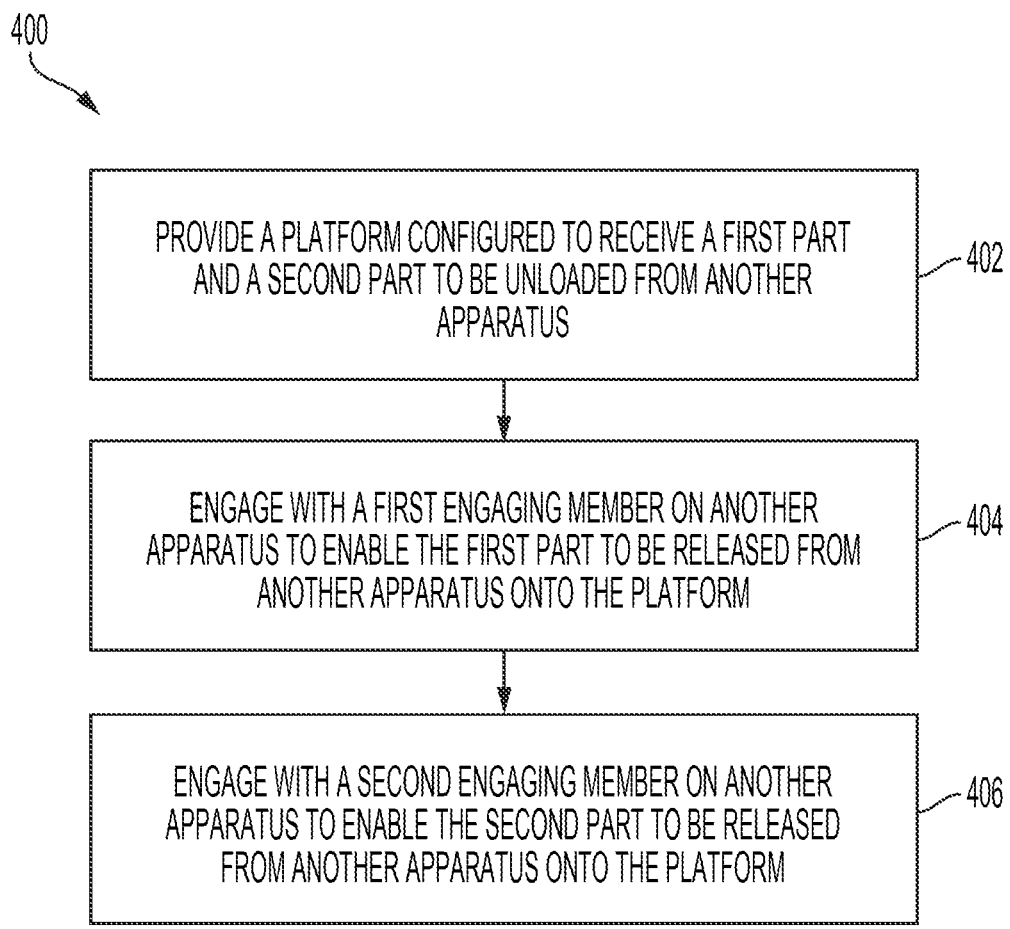
FIG. 4 is a flowchart illustrating a method for unloading a part from another system according to an embodiment of the present invention.

Turning to FIG. 4, a method 400 for receiving a part to be unloaded from another system is disclosed. The method 400, at least in part, may be implemented via a plurality of instructions (e.g., a software program) stored on a memory (similar to the memory 130 described herein with respect to FIG. 1E) and accessed and processed by a processor (e.g., on or within the controller 126 described herein with respect to FIG. 1E) to perform the various steps of the method 400.

In step 402, the method 400 includes providing a platform configured to receive a first part and a second part to be unloaded from another apparatus.

In step 404, the method 400 includes engaging, via a first guide member, with a first engaging member on another apparatus to enable the first part to be released from another apparatus onto the platform. That is, engaging the first engaging member on another apparatus via the first guide member may be performed such that the first guide member contacts the first engaging member to actuate the first engaging member to move and enable another apparatus to release the first part onto the platform.

In step 406, the method 400 includes engaging, via a second guide member, with a second engaging member on another apparatus to enable the second part to be released from another apparatus onto the platform. That is, engaging the second engaging member on another apparatus via the second guide member may be performed such that the second guide member contacts the second engaging member to actuate the second engaging member to move and enable the second part to be released from another apparatus onto the platform.

The method 400 may also include detecting, via a sensor, sensor data indicative of a presence of the first part on the platform. Also, the second guide member may be connected to the platform, and the method 400 may further include determining, by a controller coupled to the sensor, that the first part has been unloaded from another apparatus onto the platform based on the sensor data. Moreover, the method 400 may include lifting, by a lifter, the platform in response to determining that the first part has been unloaded from another apparatus onto the platform such that the second guide member is lifted to contact the second engaging member and to actuate the second engaging member to move and enable the second part to be released from another apparatus onto the platform.

Engaging the first engaging member on another apparatus via the first guide member may include contacting, via the first guide member, the first engaging member on another apparatus and causing a first gate member connected to the first engaging member on another apparatus to move to an open position to release the first part onto the platform. Moreover, engaging the second engaging member on another apparatus via the second guide member may include contacting, via the second guide member, the second engaging member on another apparatus and causing a second gate member connected to the second engaging member on another apparatus to move to an open position to release the second part onto the platform.

Where used throughout the specification and the claims, "at least one of A or B" includes "A" only, "B" only, or "A and B." Exemplary embodiments of the apparatus, the system, and the method described herein have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments (e.g., including a singular element where multiple elements are described and/or multiple elements where a singular element is described, etc.) that reasonably fall within the scope of the advancement to the art hereby contributed, and that that scope shall not be restricted, except in light of the appended claims and their equivalents.

What is claimed is:

1. An apparatus for receiving at least a part to be unloaded from a system, the apparatus comprising:
    a platform configured to receive a first part and a second part to be unloaded from another apparatus;
    a first guide member configured to engage with a first engaging member on the another apparatus to enable the first part to be unloaded from the another apparatus onto the platform; and
    a second guide member configured to engage with a second engaging member on the another apparatus after the first part is unloaded and configured to actuate the second engaging member to enable the second part to be unloaded from the another apparatus onto the platform.

2. The apparatus of claim 1, wherein the second guide member is connected to the platform; and
    wherein the apparatus further comprises a lifter connected to the platform and configured to lift the platform after the first part is unloaded from the another apparatus onto the platform and to cause the second guide member to engage with the second engaging member on the another apparatus.

3. The apparatus of claim 2, wherein the lifter includes a hydraulic lifter including at least one cylinder.

4. The apparatus of claim 2, wherein the lifter includes a motorized lifter.

5. The apparatus of claim 2, further comprising a sensor configured to detect sensor data indicative of a presence of the first part on the platform; and
wherein the lifter is further configured to lift the platform after the sensor detects the first part on the platform.

6. The apparatus of claim 5, wherein the sensor includes a photo eye.

7. The apparatus of claim 5, wherein the sensor includes an image sensor configured to detect image data indicative of the presence of the first part on the platform.

8. The apparatus of claim 5, wherein the sensor includes a weight sensor configured to detect weight data indicative of the presence of the first part on the platform.

9. A system for receiving at least a part to be unloaded from another system, the system comprising:
a platform configured to receive a first part and a second part to be unloaded from an apparatus;
a first guide member configured to engage with a first engaging member on the apparatus and actuate the first engaging member on the apparatus to move to enable the first part to be unloaded from the apparatus onto the platform; and
a second guide member configured to engage with a second engaging member on the apparatus in response to the first part being unloaded from the apparatus onto the platform and actuate the second engaging member on the apparatus to move to enable the second part to be unloaded from the apparatus onto the platform.

10. The system of claim 9, wherein the second guide member is connected to the platform; and
wherein the system further comprises a lifter connected to the platform and configured to lift the platform after the first part is unloaded from the apparatus onto the platform and to cause the second guide member to engage with the second engaging member on the apparatus.

11. The system of claim 10, wherein the lifter includes a hydraulic lifter including at least one cylinder.

12. The system of claim 10, wherein the lifter includes a motorized lifter.

13. The system of claim 10, further comprising a sensor configured to detect sensor data indicative of a presence of the first part on the platform; and
wherein the lifter is further configured to lift the platform after the sensor detects the first part on the platform.

14. The system of claim 13, wherein the sensor includes a photo eye.

15. The system of claim 13, wherein the sensor includes an image sensor configured to detect image data indicative of the presence of the first part on the platform.

16. The system of claim 13, wherein the sensor includes a weight sensor configured to detect weight data indicative of the presence of the first part on the platform.

17. A method for receiving at least a part to be unloaded from a system, the method comprising:
providing a platform configured to receive a first part and a second part to be unloaded from an apparatus;
engaging, via a first guide member, with a first engaging member on the apparatus such that the first guide member contacts the first engaging member to actuate the first engaging member to move and enable the first part to be released from the apparatus onto the platform; and
engaging, via a second guide member, with a second engaging member on the apparatus such that the second guide member contacts the second engaging member to actuate the second engaging member to move and enable the second part to be released from the apparatus onto the platform.

18. The method of claim 17, further comprising detecting, via a sensor, sensor data indicative of a presence of the first part on the platform.

19. The method of claim 18, wherein the second guide member is connected to the platform; and
wherein the method further comprises:
determining, by a controller coupled to the sensor, that the first part has been unloaded from the apparatus onto the platform based on the sensor data, and
lifting, by a lifter, the platform in response to determining that the first part has been unloaded from the apparatus onto the platform such that the second guide member is lifted to contact the second engaging member and to actuate the second engaging member to move and enable the second part to be released from the apparatus onto the platform.

20. The method of claim 17, wherein engaging the first engaging member on the apparatus via the first guide member includes contacting, via the first guide member, the first engaging member on the apparatus and causing a first gate member connected to the first engaging member on the apparatus to move to an open position to release the first part onto the platform; and
wherein engaging the second engaging member on the apparatus via the second guide member includes contacting, via the second guide member, the second engaging member on the apparatus and causing a second gate member connected to the second engaging member on the apparatus to move to an open position to release the second part onto the platform.

* * * * *